United States Patent [19]

Kano

[11] Patent Number: 4,824,597

[45] Date of Patent: Apr. 25, 1989

[54] LIQUID CRYSTAL COMPOSITION

[75] Inventor: Mitsuru Kano, Furukawa, Japan

[73] Assignee: Alps Electric Co., Ltd., Japan

[21] Appl. No.: 170,916

[22] Filed: Mar. 17, 1988

[30] Foreign Application Priority Data

Jun. 23, 1987 [JP] Japan ................................ 62-155804

[51] Int. Cl.$^4$ ......................... G02F 1/13; C09K 19/34
[52] U.S. Cl. ......................... 252/299.61; 252/299.01; 252/299.67; 252/299.65; 350/350 S; 544/298
[58] Field of Search ...................... 252/299.61, 299.01, 252/299.5; 350/350 S, 350 R; 544/298

[56] References Cited

U.S. PATENT DOCUMENTS 4,725,688  2/1988  Taguchi et al. ................ 252/299.61

FOREIGN PATENT DOCUMENTS

| 206228 | 12/1986 | European Pat. Off. ....... | 252/299.61 |
| 3500909 | 7/1986 | Fed. Rep. of Germany ......................... | 252/299.61 |
| 3515373 | 11/1986 | Fed. Rep. of Germany ......................... | 252/299.61 |
| 61-271279 | 12/1986 | Japan .............................. | 252/299.61 |
| 62-209190 | 9/1987 | Japan .............................. | 252/299.61 |
| 8606401 | 11/1986 | World Int. Prop. O. ....... | 252/299.61 |

Primary Examiner—Teddy S. Gron
Attorney, Agent, or Firm—Guy W. Shoup; Paul J. Winters; Stephen L. Malaska

[57] ABSTRACT

A liquid crystal composition includes at least one of specific pyrimidine compounds, and may be used to form a strong dielectric liquid crystal display element.

1 Claim, 2 Drawing Sheets

LIQUID CRYSTAL COMPOSITION

FIELD OF THE INVENTION

This invention relates to a liquid crystal composition used in a strong dielectric liquid crystal display element, etc.

BACKGROUND OF THE INVENTION

Recently, various liquid crystal compositions exhibiting high dielectricities are proposed. However, there are very few liquid compositions that are acceptable in orientation and response, and have the lower limit of the temperature range of the chiral smectic C(Sc*) phase below the room temperature.

For example, by mixing compounds A, B and C shown by the following formulas (A), (B) and (C) as proposed by Goodby, etc., a liquid crystal composition having acceptable orientation and response is obtained. (In the formulas below, (S) and (R) mean that the absolute configuration of an optical active group forming its side chain is of S type or R type.)

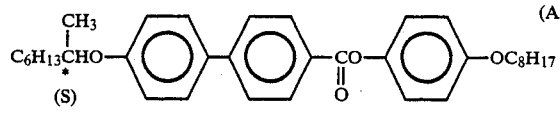

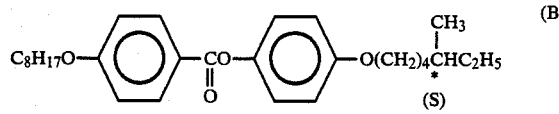

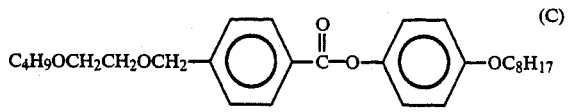

Analyzing the relationship between the transition point temperature and the formulating ratio of a liquid crystal composition consisting of these compounds A, B and C, it is recognized that the optimum temperature range representing the Sc* phase is about 13° C. to 55° C.

The optimum temperature range of the Sc* phase of a liquid crystal composition obtained by mixing liquid crystal compounds D and E shown by the following formulas (D) and (E) is about 20° C. to 65° C.

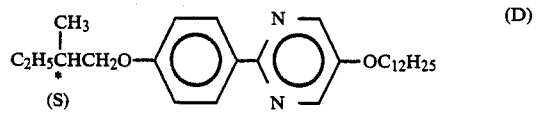

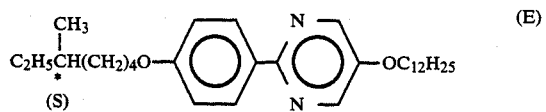

On the other hand, there is a proposal to mix compounds having different skeltons to extend the Sc* phase temperature range. The optimum Sc* phase temperature range of a composition obtained by the foregoing compounds A to E as taught by the proposal is about 0° to 63° C.

As studied above, prior art strong dielectric liquid crystal compositions did not have the Sc* phase lower limit temperature sufficiently low for a reliable practical use.

OBJECT OF THE INVENTION

It is therefore an object of the invention to provide a strong dielectric liquid crystal composition having excellent orientation and response and have the Sc* phase lower limit temperature below the room temperature.

SUMMARY OF THE INVENTION

An invention liquid crystal composition includes at least a pyrimidine compound I shown by the following general formula (I):

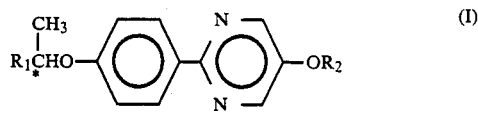

(where $R_1$ is an alkyl group shown by $C_nH_{2n+1}$, $R_2$ is an alkyl group shown by $C_mH_{2m+1}$, $4 \leq n \leq 8$ and $6 \leq m \leq 14$).

Among compounds (I) shown by the general formula (I), those wherein $n=6$ and $m=12$ are optimum.

Addition of the pyrimidine compound I can drop the Sc* phase temperature range to obtain a liquid crystal composition which exhibits the Sc* phase below the room temperature.

Although, various liquid compounds may be used to be mixed with the pyrimidine compound I, it is preferable that the liquid crystal composition is mixed with at least one sort of liquid crystal compounds having the ester linkage like the foregoing compounds A and B. The pyrimidine compound I to be added to the composition is preferably 70 mol % or less. If the added amount of the compound I exceeds 70 mol %, the Sc* phase upper limit temperature largely drops to the range of the room temperature.

DETAILED DESCRIPTION

The invention is described below in detail, referring to preferred embodiments.

(Embodiment 1)

A pyrimidine compound II shown by the following formula (II) was added to the mixture of the compounds A to E to determine the relationship between the added amount of the compound II and the transition point temperature.

The mixture ratio of the compounds A to E was A:B:C:D:E =27:40.5:7.5:20:5 (mol ratio).

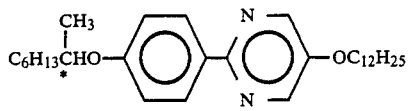

(II)

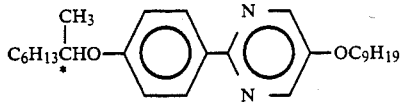

(III)

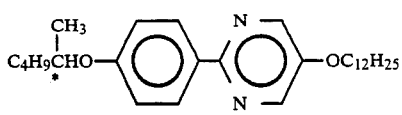

(IV)

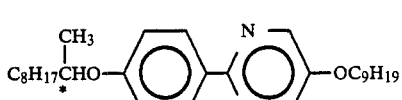

(V)

Figure 1:
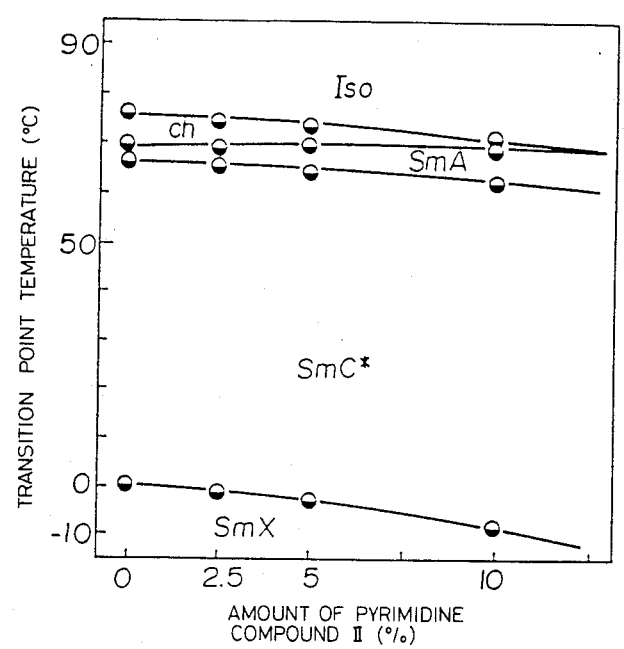
FIG. 1 is a graph showing the relationship between the transition point temperature and the mixture ratio of a liquid crystal composition according to embodiment 1 of the invention.

The results are shown in FIG. 1.

For the purpose of comparison, the relationship between the mixture ratio and the transition point temperature was studied about some prior art liquid crystal compositions.

Figure 2:
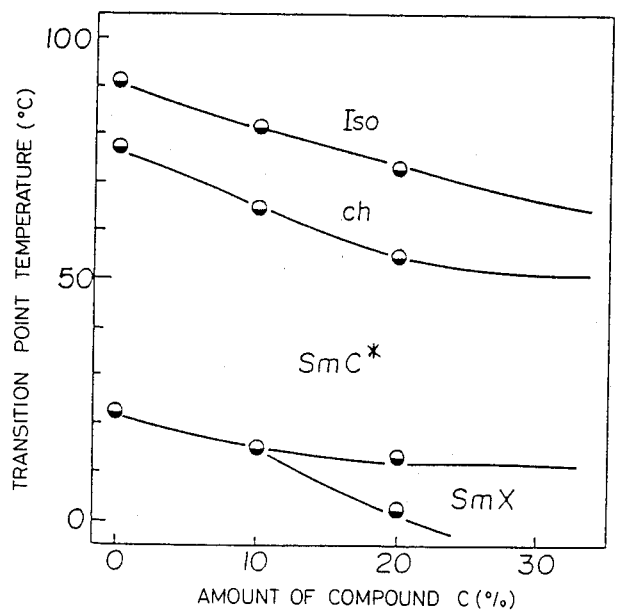
FIG. 2 to 4 are graphs each showing the relationship between the transition point temperature and the mixture ratio of a liquid crystal composition of compared examples 1 to 3.

As compared example 1, a liquid crystal composition consisting of compounds A, B and C was taken. The composition was prepared by first mixing compounds A and B by A:B=4:6 (mol ratio) into a resulting mixture Z and subsequently adding compound C threto. The results are shown in FIG. 2.

Figure 3:
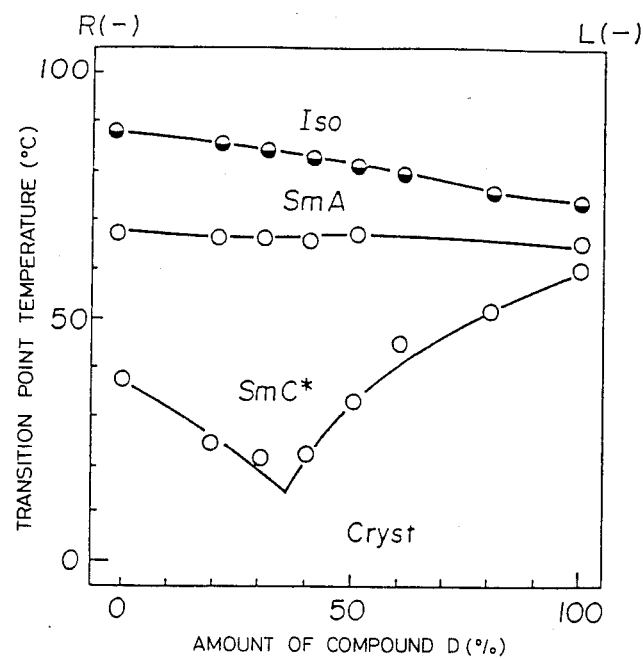

Subsequently, a liquid crystal composition consisting of compounds D and E taken as compared example 2 was studied. The results are shown in FIG. 3.

Figure 4:
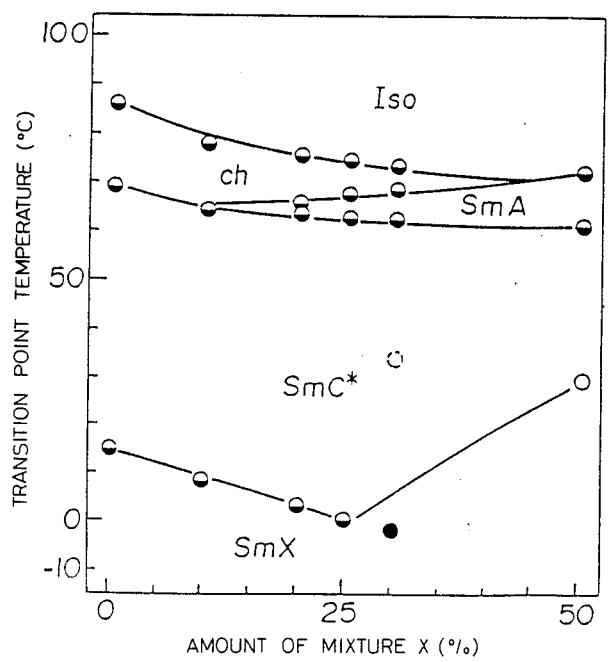

Further, a liquid crystal composition consisting of compounds A through E taken as compared example 3 was studied. The composition was prepared by first mixing compounds A, B and C by A:B:C=37:55.5:7.5 (mol ratio) into a resulting mixture Y, separately mixing compounds D and E by D:E=8:2 (mol ratio) into a resulting mixture Y, and finally mixing mixtures X and Y together. The results are shown in FIG. 4.

It is recognized from the results of FIG. 1 that the Sc* phase temperature range, particularly the lower limit temperature of the liquid crystal composition according to embodiment 1 mixed with the pyrimidine compound II can be decreased more than those of compared examples 1 to 3. It is further recognized that the composition added with 10 mol % of the pyrimidine compound II was dropped in the Sc* phase temperature as much as $-10 \sim +60°$ C. If the added amount of the pyrimidine compound II exceeds 70 mol %, the Sc* phase upper limit temperature largely drops to 40° C. or less. Therefore, a preferable added amount of compound II appears to be 70% or less.

Next, a liquid crystal composition including 10 mol % of pyrimidine compound II was injected in a liquid crystal cell having a cell thickness of 2 μm to study its orientation and response. The liquid crystal cell was prepared by spreading polyimide on a glass substrate having transparent electrodes of indium-tin oxide (ITO) and subsequently carrying out a rubbing treatment in one axial direction.

Studying the prepared liquid crystal cell, it was recognized that the liquid crystal composition exhibits an excellent orientation and a bi-stability. Subsequently, a current voltage of $-10V$ rectangular waveform was applied to it to determine its response speed, and it was recognized that it exhibits a high speed response below 200 μmsec below the room temperature.

(Embodiments 2 through 4)

The same experiment as embodiment 1 was carried out on compositions each prepared by adding a pyrimidine compound III, IV or V shown by the following general formulas, in lieu of the pyrimidine compound II used in embodiment 1.

As a result, it was recognized that addition of any of pyrimidine compounds III to V decreases the Sc* phase temperature range of the composition in the substantially same degree as embodiment 1 does.

Further, either composition mixed with the compound III, IV or V exhibited an excellent orientation and response.

As described above, since the inventive liquid crystal composition includes at least one pyrimidine compound shown by the general formula (I), the Sc* phase temperature range can be lowered.

Therefore, the invention provides a strong dielectric liquid crystal composition having excellent orientation and response and having the lower limit temperature of the Sc* phase below the room temperature.

What is claimed is:

1. A liquid crystal composition comprising:
   less than 15 mol % of a pyrimidine compound expressed by the following general formula (I)

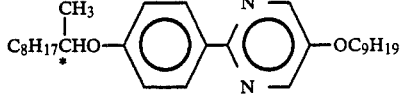

(I)

where $R_1$ is an alkyl group expressed by $C_nH_{2n+1}$ and $R_2$ is an alkyl group expressed by $C_mH_{2m+1}$, wherein $4 \leq n \leq 8$, and $6 \leq n14$; and the balance of the following compounds (II), (III) and (IV)

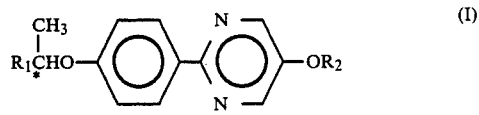

(II)

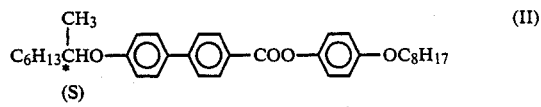

(III)

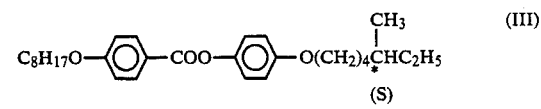

(IV)

where (S) indicates that the absolute configuration of an optically active group forming its side chain is of S type, and where * indicates an asymmetric carbon atom.

* * * * *